United States Patent
Maeng et al.

(10) Patent No.: US 9,188,953 B2
(45) Date of Patent: Nov. 17, 2015

(54) ACOUSTO-OPTIC DEVICE HAVING NANOSTRUCTURE, AND OPTICAL SCANNER, OPTICAL MODULATOR, AND DISPLAY APPARATUS USING THE ACOUSTO-OPTIC DEVICE

(75) Inventors: Wan-joo Maeng, Seoul (KR); Seung-hoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 509 days.

(21) Appl. No.: 13/591,363

(22) Filed: Aug. 22, 2012

(65) Prior Publication Data

US 2013/0050788 A1  Feb. 28, 2013

(30) Foreign Application Priority Data

Aug. 24, 2011  (KR) .................. 10-2011-0084823

(51) Int. Cl.
*G03H 1/02* (2006.01)
*G03H 1/22* (2006.01)
*G02F 1/125* (2006.01)
*G02F 1/29* (2006.01)

(52) U.S. Cl.
CPC .................. *G03H 1/02* (2013.01); *G02F 1/125* (2013.01); *G02F 1/29* (2013.01); *G03H 1/2294* (2013.01); *G03H 2001/0224* (2013.01); *G03H 2225/21* (2013.01)

(58) Field of Classification Search
CPC .... H04N 1/1275; H04N 5/335; G02F 1/0131; G02F 1/0136; G03H 2225/21
See application file for complete search history.

(56) References Cited

U.S. PATENT DOCUMENTS

| 5,276,745 | A * | 1/1994 | Revelli, Jr. .................. 385/14 |
| 7,864,313 | B2 | 1/2011 | Baumberg et al. |
| 2012/0194885 | A1 | 8/2012 | Han et al. |

FOREIGN PATENT DOCUMENTS

| JP | 10-98231 A | 4/1998 |
| KR | 2000-0019294 A | 4/2000 |
| KR | 2001-0036949 A | 5/2001 |

* cited by examiner

*Primary Examiner* — Jennifer L. Doak
(74) *Attorney, Agent, or Firm* — NSIP Law

(57) ABSTRACT

An acousto-optic device includes an optical waveguide in which incident light is able to propagate; a metal layer surrounding at least a first portion of the optical waveguide; a gain medium layer disposed in the first portion of the optical waveguide; and a sonic wave generator configured to generate surface acoustic waves (SAWs) and apply the SAWs to the optical waveguide and/or the metal layer.

33 Claims, 5 Drawing Sheets

10

10'

US 9,188,953 B2

ACOUSTO-OPTIC DEVICE HAVING NANOSTRUCTURE, AND OPTICAL SCANNER, OPTICAL MODULATOR, AND DISPLAY APPARATUS USING THE ACOUSTO-OPTIC DEVICE

CROSS-REFERENCE TO RELATED APPLICATIONS

This application claims the benefit of Korean Patent Application No. 10-2011-0084823 filed on Aug. 24, 2011, in the Korean Intellectual Property Office, the disclosure of which is incorporated herein by reference in its entirety.

BACKGROUND

1. Field

This disclosure relates to acousto-optic devices having nanostructures, optical scanners, optical modulators, and display apparatuses using the acousto-optic devices, and more particularly, to an acousto-optic device having a nanostructure to increase a range of a diffraction angle of output light, an optical scanner, an optical modulator, and a display apparatus using the acousto-optic device.

2. Description of the Related Art

The acousto-optic effect is an effect in which a refractive index of light is periodically varied in a medium by a series of compressions and rarefactions in the medium produce by sonic waves such as ultrasonic waves propagating in the medium. The series of compressions and rarefactions produces a phase grating in the medium, which diffracts light incident on the medium. In general, a medium exhibiting the acousto-optic effect is called an acousto-optic medium. An intensity and a diffraction angle of diffracted light produced by the phase grating in the medium depend on an intensity of the sonic waves and a frequency of the sonic waves, respectively. Thus, an acousto-optic device having a sonic wave generator such as an ultrasonic wave generator on a surface of the medium having the aforementioned characteristic may be used in an optical modulator for modulating the amplitude of incident light, or in an optical scanner for deflecting incident light.

However, acousto-optic devices that use raw mediums existing in the natural world have a limited range of a diffraction angle of output light due to a limited optical anisotropy and a limited acousto-optic coefficient of the mediums. That is, in an acousto-optic medium according to the related art, a range of a diffraction angle of output light is too narrow. Thus, when an acousto-optic device according to the related art is used in various optical application fields, including an optical scanner, an optical modulator, a display or the like, a separate optical system is required to compensate for the narrow range of the diffraction angle. This separate optical system increases a size of the system and/or may reduce resolution of the system. Accordingly, research into various structures of the acousto-optic medium and an increase in a range of a diffraction angle of the acousto-optic device have been conducted.

SUMMARY

According to an aspect, an acousto-optic device includes an optical waveguide in which incident light is able to propagate; a metal layer surrounding at least a first portion of the optical waveguide; a gain medium layer disposed in the first portion of the optical waveguide; and a sonic wave generator configured to generate surface acoustic waves (SAWs) and apply the SAWs to the optical waveguide and/or the metal layer.

The acousto-optic device may further include a substrate; and the optical waveguide may be disposed on a surface of the substrate.

The optical waveguide may be disposed on a first surface of the substrate; and the sonic wave generator may be disposed on a second surface of the substrate that is substantially perpendicular to the first surface of the substrate, or on the first surface of the substrate.

The acousto-optic device may further include at least one additional optical waveguide in which light is able to propagate and having a same structure as the optical waveguide, such that the acousto-optic device includes a plurality of optical waveguides; and the plurality of optical waveguides may be disposed on the surface of the substrate parallel to each other at a uniform spacing.

The optical waveguide may a tapered cross-section including at least one oblique surface.

The tapered cross-section of the optical waveguide may have a trapezoid shape including a first surface; a second surface that is wider than the first surface and is parallel to the first surface; a third surface that is wider than the first surface and connects a first end of the first surface to a first end of the second surface; and a fourth surface that is wider than the first surface and connects a second end of the first surface to a second end of the second surface; the third surface and/or the fourth surface may be oblique to the first surface and the second surface; the metal layer may surround at least a narrow portion of the optical waveguide that is adjacent to the first surface; and the gain medium layer may be disposed in the narrow portion of the optical waveguide.

A line parallel to the first surface and the second surface and halfway between the first surface and the second surface may define a midpoint of the optical waveguide; and the gain medium layer may be disposed in a portion of the optical waveguide between the midpoint of the optical waveguide and the first surface.

The metal layer may surround at least the narrow portion of the optical waveguide and the gain medium layer.

The gain medium layer may include a light emitting material or a gain material capable of emitting or amplifying light in response to an optical or electrical stimulus.

The gain medium layer may include a multiple quantum well (MQW) structure in which a plurality of quantum barrier layers and a plurality of quantum well layers are alternately and repeatedly deposited, or a quantum dot.

The acousto-optic may further include at least one additional optical waveguide in which light is able to propagate and having a same structure as the optical waveguide, such that the acousto-optic device includes a plurality of optical waveguides; and there may be a space between the metal layers of adjacent ones of the plurality of optical waveguides.

According to an aspect, an optical scanner includes a first acousto-optic device described above configured to deflect light in a first direction; a second acousto-optic device described above configured to deflect light in a second direction perpendicular to the first direction; and an optical coupling device configured to make light incident on the first acousto-optic device.

The optical scanner may further include a substrate; and the first acousto-optic device and the second acousto-optic device may be disposed in the substrate adjacent to each other.

According to an aspect, a two-dimensional/three-dimensional (2D/3D) switching stereoscopic image display apparatus includes a display panel; and an acousto-optic device array disposed on a surface of the display panel and configured to deflect an image to be displayed on the display panel; wherein the acousto-optic device array includes a plurality of the acousto-optic device described above.

Each of the plurality of acousto-optic devices of the acousto-optic device array may extend in a horizontal direction; and the plurality of acousto-optic devices may be arrayed in a vertical direction.

Each of the plurality of acousto-optic devices of the acousto-optic device array may correspond to one pixel row of the display panel.

According to an aspect, a holographic display apparatus includes a light source configured to emit light; an acousto-optic device array configured to deflect the light emitted from the light source, and including a plurality of the acousto-optic device described above; and a projection optical system configured to project the light deflected by the acousto-optic device array.

Each of the plurality of acousto-optic devices of the acousto-optic device array may extend in a horizontal direction; and the plurality of acousto-optic devices may be arrayed in a vertical direction.

The plurality of acousto-optic devices may generate hologram rows in a horizontal direction of a hologram image displayed by the holographic display apparatus; and each of the plurality of acousto-optic devices of the acousto-optic device array may correspond to one of the hologram rows.

According to an aspect, an acousto-optic device includes a substrate; at least two metal layers that are disposed on the substrate and are parallel to each other; an optical waveguide that is disposed at least between the at least two metal layers and in which incident light is able to propagate; a gain medium layer disposed in the optical waveguide at least between adjacent ones of the at least two metal layers in a portion of the optical waveguide that is adjacent to the substrate; and a sonic wave generator configured to generate surface acoustic waves (SAWs) and apply the SAWs to the optical waveguide and/or the at least two metal layers.

The at least two metal layers may extend in a direction in which the incident light propagates in the optical waveguide.

The at least two metal layers and the optical waveguide may each have a tapered cross-section including at least one oblique surface.

The tapered cross-section of each of the at least two metal layers may a trapezoid shape including a first surface adjacent to the substrate; a second surface that is wider than the first surface and is parallel to the first surface; a third surface that is wider than the first surface and connects a first end of the first surface to a first end of the second surface; and a fourth surface that is wider than the first surface and connects a second end of the first surface to a second end of the second surface; the third surface and/or the fourth surface may be oblique to the first surface and the second surface; and the tapered cross-section of the optical waveguide may have an inverse trapezoid shape including a fifth surface; a sixth surface adjacent to the substrate that is wider than the fifth surface and is parallel to the fifth surface; a seventh surface that is wider than the fifth surface and connects a first end of the fifth surface to a first end of the sixth surface; and an eight surface that is wider than the fifth surface and connects a second end of the fifth surface to a second end of the sixth surface; and the seventh surface and/or the eighth surface is oblique to the fifth surface and the sixth surface.

The gain medium layer may be disposed in the optical waveguide at least between adjacent ones of the at least two metal layers in a narrow portion of the optical waveguide that is adjacent to the substrate.

According to an aspect, an optical scanner includes a first acousto-optic device described above configured to deflect light in a first direction; a second acousto-optic device of described above configured to deflect light in a second direction perpendicular to the first direction; and an optical coupling device configured to make light incident on the first acousto-optic device.

According to an aspect, a two-dimensional/three-dimensional (2D/3D) switching stereoscopic image display apparatus includes a display panel; and an acousto-optic device array disposed on a surface of the display panel and configured to deflect an image to be displayed on the display panel; wherein the acousto-optic device array may include a plurality of the acousto-optic device described above.

According to an aspect, a holographic display apparatus includes a light source configured to emit light; an acousto-optic device array configured to deflect the light emitted from the light source, and including a plurality of the acousto-optic device described above; and a projection optical system configured to project the light deflected by the acousto-optic device array.

According to an aspect, an acousto-optic device includes an optical waveguide through which light can propagate; a gain medium layer disposed in the optical waveguide; a metal layer surrounding at least a portion of the optical waveguide in which the gain medium layer is disposed; and a sonic wave generator configured to generate surface acoustic waves (SAWs) and apply the SAWs to the optical waveguide and/or the metal layer.

The optical waveguide may have a cross-section including at least one surface that is oblique to at least one other surface.

The optical waveguide may have a cross-section including a narrow end and a wide end that is wider than the narrow end; the gain medium layer may be disposed in the optical waveguide so that the gain medium layer is closer to the narrow end than to the wide end; and the metal layer may surround at least a portion of the optical waveguide that extends from the narrow end to a position of the gain medium layer.

The gain medium layer may include a light emitting material or a gain material capable of emitting or amplifying light in response to surface plasmons excited at an interface between the optical waveguide and the metal layer by light propagating through the optical waveguide.

Additional aspects will be set forth in part in the description that follows and, in part, will be apparent from the description, or may be learned by practice of the described examples.

BRIEF DESCRIPTION OF THE DRAWINGS

The above and other aspects will become apparent and more readily appreciated from the following description of examples, taken in conjunction with the accompanying drawings of which.

DETAILED DESCRIPTION

Figure 1:
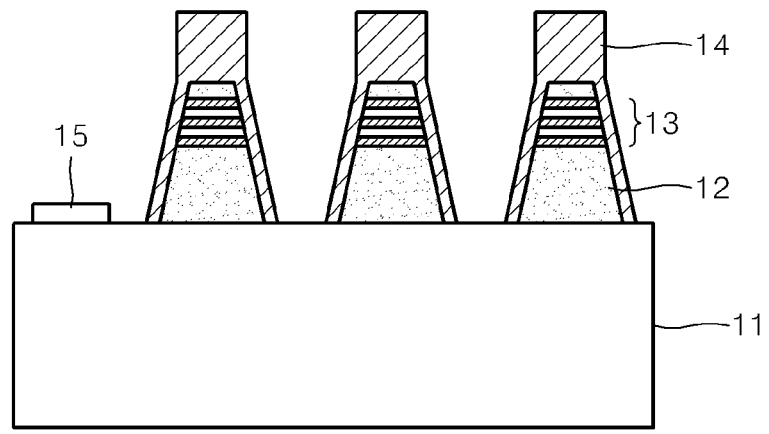
FIG. 1 is a cross-sectional view of a schematic structure of an acousto-optic device according to an example.

Reference will now be made in detail to examples of an acousto-optic device having a multi-layer nanostructure, and an optical scanner, an optical modulator, and a display apparatus using the acousto-optic device, examples of which are illustrated in the accompanying drawings. In the drawings, like reference numerals denote like elements, and the size of each element may be exaggerated for clarity. As used herein, expressions such as "at least one of," when preceding a list of elements, modify the entire list of elements and do not modify the individual elements of the list. For example, the expression "at least one of A, B, and C" is to be interpreted as covering A, or B, or C, or A and B, or A and C, or B and C, or A, B, and C. It is not to be interpreted as covering at least one A and at least one B and at least one C.

FIG. 1 is a cross-sectional view of a schematic structure of an acousto-optic device 10 according to an example. Referring to FIG. 1, the acousto-optic device 10 includes a substrate 11, optical waveguides 12 disposed on the substrate 11 and in which incident light propagates, metal layers 14 surrounding at least vertex portions of the optical waveguides 12, gain medium layers 13 disposed in the vertex portions of the optical waveguides 12, and a sonic wave generator 15 for generating surface acoustic waves (SAWs), such as ultrasonic waves, and applying the SAWs to the optical waveguides 12. As used herein, "vertex" refers to a surface of an optical waveguide having a smallest width among all surfaces of the optical waveguide in a cross-section of the optical waveguide.

Although three optical waveguides 12 are shown in FIG. 1, the number of the optical waveguides 12 is not limited thereto. For example, only one or two optical waveguides 12 may be disposed, or four or more optical waveguides 12 may be disposed. The optical waveguides 12 may be arranged parallel to each other. The optical waveguides 12 may be formed of a transparent dielectric material. For example, an acousto-optic material such as $LiNbO_3$, ZnO, GaN, $TiO_2$, $SrTiO_3$, etc., or a general transparent dielectric material such as $SiO_2$ may be used to form the optical waveguides 12. The optical waveguides 12 have a tapered cross-section including oblique side surfaces as shown in FIG. 1. As used herein, "oblique" means neither perpendicular nor parallel to another line or surface. For example, bottom surfaces of the optical waveguides 12 may have relatively broad widths, the vertex portions thereof may have relatively narrow widths, and vertexes thereof may have the narrowest widths. Although the oblique side surfaces of the optical waveguides 12 in FIG. 1 have the same slope, the present example is not limited thereto, and the oblique side surfaces may have different slopes, or one of the side surfaces may be a vertical side surface that is not an oblique side surface. Widths and heights of the optical waveguides 12 may be, for example, smaller than a wavelength of an incident light such as visible light. For example, the widths and heights of the optical waveguides 12 may be at least two times smaller than the wavelength of the incident light. Visible light may be considered to have a wavelength in the range of 390 nm to 750 nm. Thus, the optical waveguides 12 may be considered to be nanostructures. As used herein, the term "nanostructure" denotes a structure having elements having a dimension generally on the order of 5 nm to 500 nm, but is not limited to this exact range.

The gain medium layers 13 that amplify light may be disposed near upper portions, for example, the vertex portions, of the optical waveguides 12 having relatively narrow widths. For example, if the entire height of the optical waveguides 12 is h, the gain medium layers 13 may be disposed in a region above a height h/2 of the optical waveguides 12, i.e., above the midpoint of the optical waveguides 12. The gain medium layers 13 may have, for example, a multiple quantum well (MQW) structure in which a plurality of GaN-based quantum barrier layers and a plurality of InGaN-based quantum well layers are alternately and repeatedly deposited. In addition to the MQW structure, various light emitting materials or gain materials that emit or amplify light in response to an optical or electrical stimulus, such as quantum dots, ZnO, CdS, or a gain dye, may be used to form the gain medium layers 13. For example, the gain dye may include poly(methyl methacrylate) (PMMA) doped with Rhodamine B or PMMA doped with 4-Dicyanmethylene-2-methyl-6-(p-dimethylaminostyryl)-4H-pyran.

The metal layers 14 surround at least the upper portions, for example, the vertex portions, of the optical waveguides 12. Although the metal layers 14 entirely surround external surfaces of the optical waveguides 12 in FIG. 1, the present example is not limited thereto. For example, the metal layers 14 may surround at least the vertex portions of the optical waveguides 12 and the gain medium layers 13, and may not surround lower portions of the optical waveguides 12. The metal layers 14 may be formed of one or more metal materials, for example, Al, Ag, Au, Cu, Na, Ka, etc. Instead of the metal materials stated above, other materials having a dielectric constant with a real sign having a negative value, for example, an oxide such as indium tin oxide (ITO), aluminum-doped zinc oxide (AZO), gallium zinc oxide (GZO), indium zinc oxide (IZO), or the like, a nitride such as titanium nitride (TiN), zirconium nitride (ZrN), tantalum nitride (TaN), hafnium nitride (HfN), or the like, or graphene, etc., may be used to form the metal layers 14.

When a plurality of optical waveguides 12 are disposed, the metal layers 14 may be separately formed for the optical waveguides 12. For example, as shown in FIG. 1, the metal layer 14 formed for one of the optical waveguides 12 is separated from the metal layer 14 formed for another one of the optical waveguides 12 neighboring the metal layer 14. That is, the neighboring metal layers 14 may have a space therebetween. The metal layers 14 are not formed between adjacent ones of the optical waveguides 12 in FIG. 1, and thus an upper surface of the substrate 11 is exposed between adjacent ones of the optical waveguides 12. However, the metal layers 14 may extend on the upper surface of the substrate 11 part or all of the way between adjacent ones of the optical waveguides 11. In FIG. 1, the metal layers 14 are not completely formed between adjacent ones of the optical waveguides 12, which may simplify a process of depositing the metal layers 14 on the optical waveguides 12, thereby reducing a manufacturing time and cost of the acousto-optic device 10.

The sonic wave generator 15 may be an electro-acoustic transducer that generates SAWs such as an ultrasonic wave in response to electrical signal applied to the sonic wave generator 15. For example, an intensity of the ultrasonic wave generated by the sonic wave generator 15 may be proportional to an intensity of the applied electrical signal, and a frequency of the ultrasonic wave may be proportional to a frequency of the applied electrical signal. Although the sonic wave generator 15, along with the optical waveguides 12, is disposed on the upper surface of the substrate 11 in FIG. 1, the present example is not limited thereto. For example, the sonic wave generator 15 may be disposed on a side surface of the substrate 11, or may be disposed away from the substrate 11, for example, on another substrate contacting one or more surfaces of the substrate 11. A structure and a position of the sonic wave generator 15 are not limited as long as the SAWs such as ultrasonic waves may be applied to the optical waveguides 12.

Figure 2:
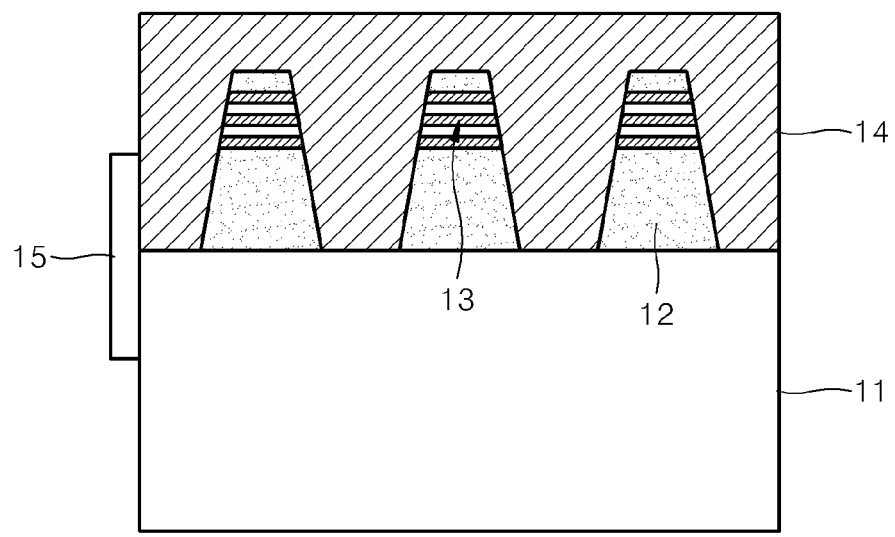
FIG. 2 is a cross-sectional view of a schematic structure of an acousto-optic device according to an example.

FIG. 2 is a cross-sectional view of a schematic structure of an acousto-optic device 10' according to an example. Referring to FIG. 2, the acousto-optic device 10' includes one metal layer 14 that entirely covers external surfaces of the optical waveguides 12 and an upper surface of the substrate 11. The other structures of the acousto-optic device 10' of FIG. 2 are the same as those of the acousto-optic device 10 of FIG. 1. In the acousto-optic device 10 of FIG. 1, the metal layers 14 are separately formed on the optical waveguides 12, and one of the metal layers 14 formed on one of the optical waveguides 12 is separated from another metal layer 14 formed on an adjacent optical waveguide 12. In contrast, the acousto-optic device 10' of FIG. 2 includes a single continuous metal layer 14 that is formed on all of the optical waveguides 12 without leaving any space between portions of the metal layer 14 formed on adjacent ones of the optical waveguides 12. That is, the metal layer 14 completely covers the upper surface of the substrate 11 between adjacent ones of the optical waveguides 12 in FIG. 2.

Although the sonic wave generator 15 in FIG. 2 is disposed on side surfaces of the substrate 11 and the metal layer 14, the position of the sonic wave generator 15 is not limited thereto. For example, the sonic wave generator 15 may be disposed on only the side surface of the substrate 11, or on only the side surface of the metal layer 14, or on an upper surface of the metal layer 14. Alternatively, the sonic wave generator 15 may be disposed away from the substrate 11 and the metal layer 14, for example, on another substrate contacting one or more surfaces of the substrate 11 and/or the metal layer 14. A structure and a position of the sonic wave generator 15 are not limited as long as SAWs such as ultrasonic waves may be applied to the optical waveguides 12.

Figure 3:
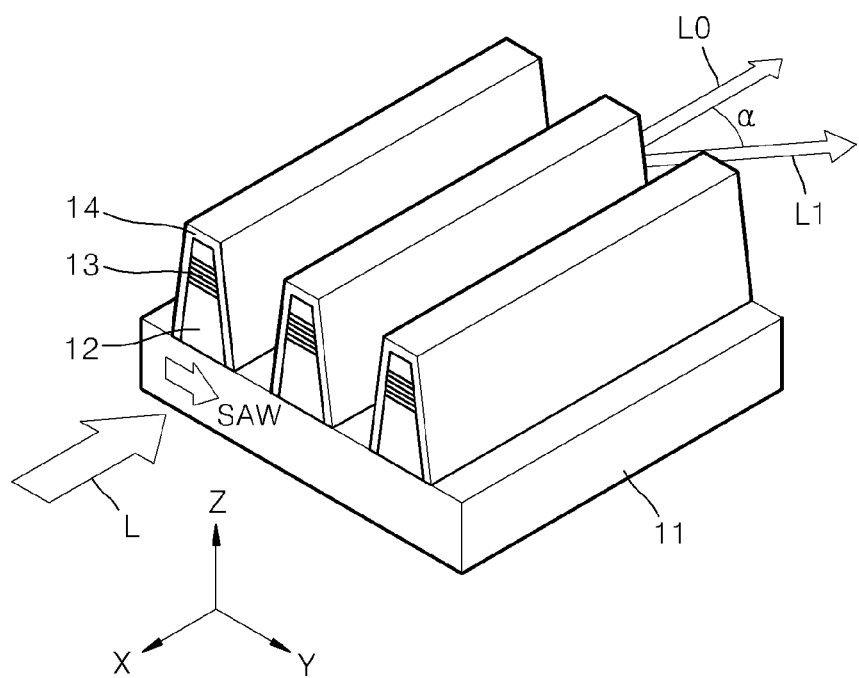
FIG. 3 is a perspective view of a schematic operation of the acousto-optic device of FIG. 1

FIG. 3 is a perspective view of a schematic operation of the acousto-optic device 10 of FIG. 1. Referring to FIG. 3, when an electrical signal is applied to the sonic wave generator 15 disposed on a side surface of the acousto-optic device 10, SAWs such as ultrasonic waves having a predetermined amplitude and frequency are generated in response to the electrical signal. As illustrated in FIG. 3 by an arrow, the SAWs generated by the sonic wave generator 15 propagate in the acousto-optic device 10 at a predetermined speed in approximately the +y direction. The SAWs propagating in the acousto-optic device 10 produce a series of compressions and rarefactions in the acousto-optic device 10. The series of compressions and rarefactions cause a local density in the acousto-optic device 10 to vary, which in turn causes a local refractive index of the acousto-optic device 10 to vary. Accordingly, when the SAWs propagate in the acousto-optic device 10, the refractive index of the acousto-optic device 10 periodically varies in a propagation direction of the SAWs according to the wavelength of the SAWs. That is, in response to the series of compressions and rarefactions produced by the SAWs, the refractive index of the acousto-optic device 10 is periodically increased by the compressions and decreased by the rarefactions. The periodic variation of the refractive index of the acousto-optic device 10 forms a phase grating having a periodic shape in the acousto-optic device 10.

Incident light L is incident onto the acousto-optic device 10 in an approximately −x direction that crosses the propagation direction of the SAWs, i.e., is substantially perpendicular to the propagation direction of the SAWs in approximately the +y direction. The incident light L incident onto the acousto-optic device 10 propagates in the acousto-optic device 10 along the optical waveguides 12 that extend in the −x direction. The incident light L propagating in the optical waveguides 12 excites surface plasmons at an interface between the metal layers 14 and the optical waveguides 12, which are formed of a dielectric material. Surface plasmons are electromagnetic waves (i.e., light) produced by a charge density oscillation of electrons that occur on a surface of a metal when light is incident on the interface between the metal and a dielectric. If the acousto-optic device 10 has a structure that is sufficiently smaller than a wavelength of the light L that is incident on the acousto-optic device 10, the light L will excite surface plasmons at the interface between the metal layers 14 and the optical waveguides 12. The surface plasmons at the interface between the metal layers 14 and the optical waveguides 12 makes the acousto-optic device 10 to have a strong anisotropy in which a refractive index greatly differs according to a propagation direction of the light L, like a birefringent material.

If SAWs propagate in the acousto-optic device 10 in which the light L is propagating, the light will be greatly diffracted while propagating in the optical waveguides 12 due to the strong anisotropy of the refractive index. This is because an angle range of a diffracting operation that satisfies constructive interference of diffracted light increases. Therefore, the acousto-optic device 10 having the optical waveguides 12 that are nanostructures provides an operating range of a diffraction angle that is higher than an acousto-optic medium that does not have the optical waveguides 12 that are nanostructures. The diffraction angle may be defined as an angle difference θ between a 0th order diffraction light L0 and a 1st order diffraction light L1 among light diffracted by the acousto-optic device 10. A diffraction angle and an intensity of diffracted light produced by the acousto-optic device 10 may be controlled according to a frequency and an intensity of the SAWs, respectively. Also, the frequency and the intensity of the SAWs may be determined according to an amplitude and a frequency of the electrical signal that is applied to the sonic wave generator 15. Thus, it is possible to control diffraction of light in the acousto-optic device 10 by appropriately controlling the electrical signal applied to the sonic wave generator 15.

Figure 4:
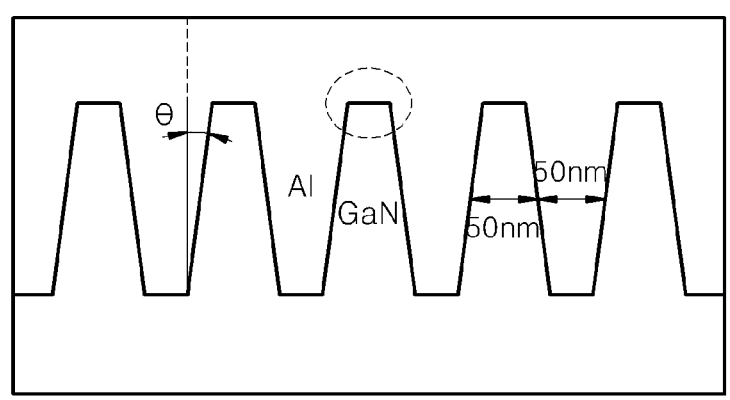
FIG. 4 is a conceptual diagram of a schematic structure of the acousto-optic device of FIG. 1 to simulate an operation of the acousto-optic device of FIG. 1.

In particular, as shown in FIG. 4 by a circular dotted line, the surface plasmons are intense near vertexes of the optical waveguides 12 having a tapered structure, which further increases the diffraction angle. The gain medium layers 13 are disposed near the vertexes of the optical waveguides 12 near which the surface plasmons are intense, which further increases the light amplification efficiency of the gain medium layers 13. The gain medium layers 13 are excited by the surface plasmons near the vertexes of the optical waveguides 12 to amplify the light L that is propagating in the optical waveguides 12, which reduces or eliminates a loss of the light L while the light L is propagating in the optical waveguides 12. That is, the surface plasmons excited in the interface between the metal layers 14 and the optical waveguides 12 are intense near the vertexes of the optical waveguides 12 while the light propagates in the optical waveguides 12, and thus the energy of the surface is mostly used to increase the diffraction angle and amplify the light. Thus, the efficiency of the acousto-optic device 10 may be enhanced.

A range of the diffraction angle of the acousto-optic device 10 may vary with respect to a tapering angle of the optical waveguide 12 as described below.

FIG. 4 is a conceptual diagram of a schematic structure of the acousto-optic device 10 of FIG. 1 to simulate an operation of the acousto-optic device 10. Referring to FIG. 4, a tapering angle θ of the optical waveguides 12 may be defined as an internal angle between a normal line perpendicular to a surface of the substrate 11 and a side surface of one of the optical waveguides 12. It is assumed in FIG. 4 that the optical waveguides 12 are formed of GaN, have isosceles trapezoid shapes having a full width at half-maximum (FWHM) of 50 nm (i.e., a width of the optical waveguide 12 at a middle height) and are uniformly spaced at an interval of 50 nm with respect to the middle heights of the optical waveguides 12. It is also assumed that MQWs having InGaN quantum wells are disposed as the gain medium layers 13 near vertexes of the optical waveguides 12 (i.e., in regions of the optical waveguides higher than the middle height), and that metal layers 14 formed of aluminum (Al) completely surround the optical waveguides 12.

Figure 5:
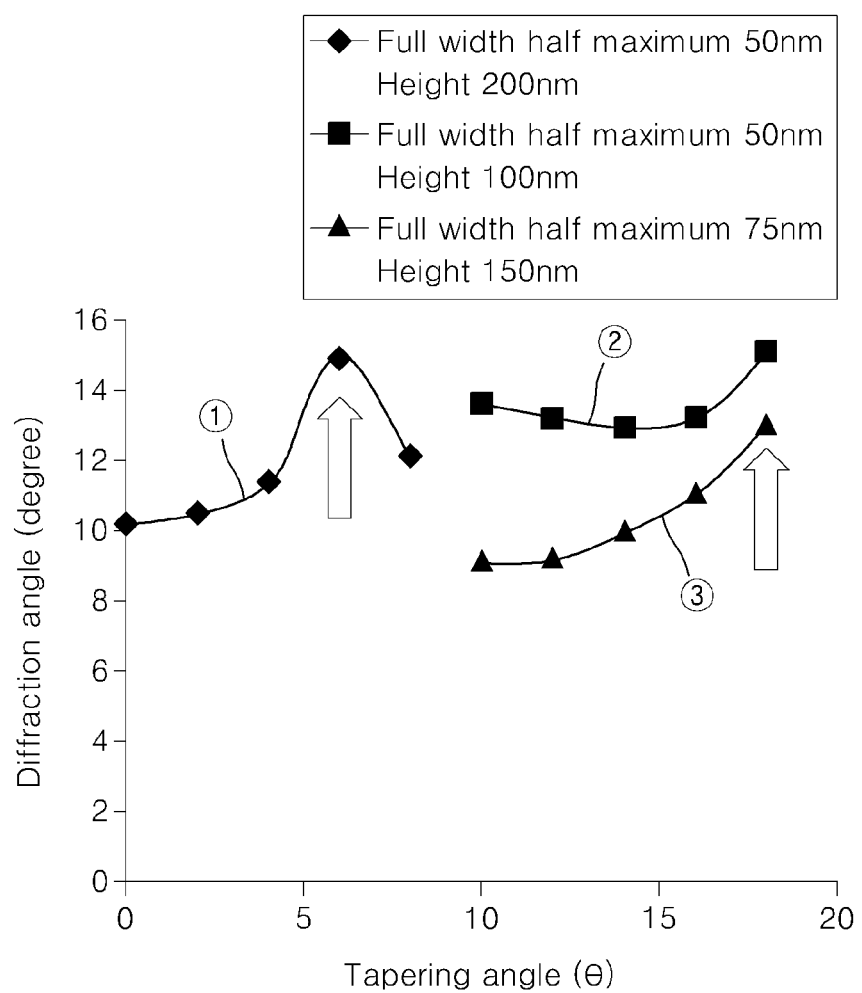
FIG. 5 is a graph of simulation of the characteristics of a diffraction angle with respect to a tapering angle of an optical waveguide of FIG. 4.

FIG. 5 is a graph of a simulation of the characteristics of a diffraction angle with respect to the tapering angle θ of the optical waveguide 12 of FIG. 4. A line ① shows the characteristics of the diffraction angle with respect to the tapering angle θ of the optical waveguide 12 having an FWHM of 50 nm and a height of 200 nm. According to the line ①, a maximum diffraction angle of about 15 degrees is obtained at a tapering angle θ of about 7 degrees. A line ② shows the characteristics of the diffraction angle with respect to the tapering angle θ of the optical waveguide 12 having an FWHM of 50 nm and a height of 100 nm. According to the line ②, a maximum diffraction angle of about 15 degrees is obtained at a tapering angle θ of about 18 degrees. A line ③ shows the characteristics of the diffraction angle with respect to the tapering angle θ of the optical waveguide 12 having an FWHM of 75 nm and a height of 150 nm. According to the line ③, a maximum diffraction angle of about 13 degrees is obtained at a tapering angle θ of about 18 degrees.

Although the optical waveguides 12 having the tapered structure are described above, an acousto-optic device in which the optical waveguides 12 and the metal layers 14 are inverted may be implemented as described below.

Figure 6:
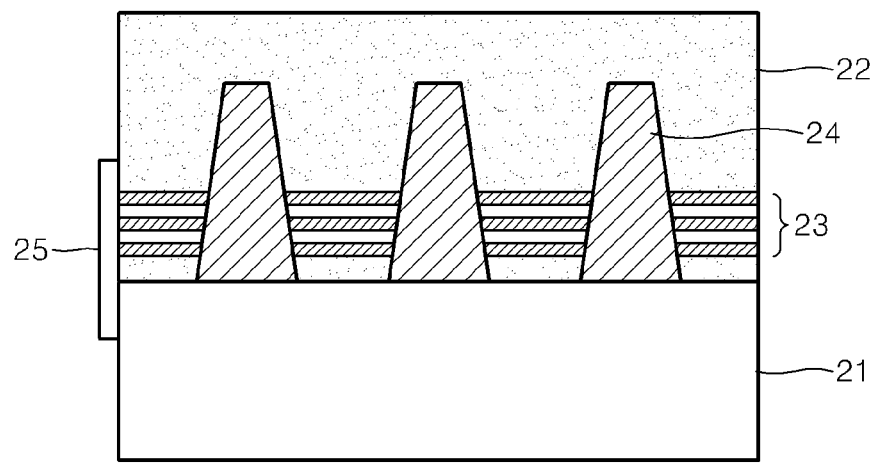
FIG. 6 is a cross-sectional view of a schematic structure of an acousto-optic device according to an example.

FIG. 6 is a cross-sectional view of a schematic structure of an acousto-optic device 20 according to an example. Referring to FIG. 6, the acousto-optic device 20 includes at least two tapered metal layers 24 disposed on a substrate 21, an optical waveguide 22 disposed between the at least two metal layers 24 and in which an incident light propagates, gain medium layers 23 disposed in vertex portions of the optical waveguide 22, and a sonic wave generator 25 generating SAWs such as ultrasonic waves and applying the SAWs to the optical waveguide 22.

The metal layers 24 may extend in a propagation direction of the incident light, and may be arranged parallel to each other on the substrate 21. The metal layers 24 have tapered cross-sections including oblique side surfaces as shown in FIG. 6. For example, the metal layers 24 may have isosceles trapezoid shapes in which bottom surfaces of the metal layers 24 have relatively broad widths and vertex portions thereof have relatively narrow widths. The at least two metal layers 24 may be arranged on the substrate 21 at a uniform spacing.

The optical waveguide 22 disposed between the metal layers 24 has tapered cross-sections including oblique side surfaces as shown in FIG. 6. For example, the optical waveguide 22 disposed between the metal layers 24 may have inverse isosceles trapezoid shapes in which a bottom surface of the optical waveguide 22 has a relatively narrow width and an upper portion thereof has a relatively broad width, which is opposite to the metal layers 24. Thus, a vertex of the optical waveguide 22 may be positioned at the bottom surface of the optical waveguide 22 in FIG. 6.

Although the oblique side surfaces of optical waveguide 22 and the metal layers 24 in FIG. 6 have the same slope, the present example is not limited thereto, and the oblique side surfaces may have different slopes, or one of the side surfaces may be a vertical side surface that is not an oblique side surface.

Widths and heights of the metal layers 24 and the tapered portions of the optical waveguide 22 may be smaller than a wavelength of incident light such as visible light. For example, the widths and heights of the metal layers 24 and the tapered portions of the optical waveguide 22 may be at least two times smaller than the wavelength of the incident light. Visible light may be considered to have a wavelength in the range of 390 nm to 750 nm. Thus, the metal layers 24 and the tapered portions of the optical waveguide 22 may be considered to be nanostructures.

The gain medium layers 23 may be disposed in the vertex portions of the optical waveguide 22 as shown in FIG. 6. That is, the gain medium layers 23 may be disposed between the bottom portions of the neighboring two metal layers 24.

Although the optical waveguide 22 entirely covers the metal layers 24 in FIG. 6, the optical waveguide 22 may be disposed only between the metal layers 24. The optical waveguide 22, the gain medium layers 23, and the metal layers 24 may be formed of the same materials as those described with reference to FIG. 1.

The acousto-optic devices 10, 10', and 20 may be applied in various fields. For example, the acousto-optic devices 10, 10', and 20 may adjust an intensity of 0th order diffracted light according to a diffraction level of light, so that the acousto-optic devices 10, 10', and 20 may operate as an optical modulator of the 0th order diffracted light. For example, if SAWs are not applied to the acousto-optic devices 10, 10', and 20, incident light is not diffracted, so that the incident light passes through the acousto-optic devices 10, 10', and 20 without a significant loss. However, if incident light is diffracted by applying SAWs to the acousto-optic devices 10, 10', and 20, ±1st order diffracted light is generated so that an intensity of 0th order diffracted light passing through the acousto-optic devices 10, 10', and 20 will decrease. If more energy is distributed to the ±1st order diffracted light according to a diffraction level, the intensity of the 0th order diffracted light will further decrease. Thus, the acousto-optic devices 10, 10', and 20 may function as an optical modulator that amplitude-modulates the intensity of the 0th order diffracted light.

Furthermore, the acousto-optic devices 10, 10', and 20 may be applied to an optical scanner that deflects incident light to a predetermined angle by varying a diffraction angle of 1st order diffracted light. In particular, when the acousto-optic devices 10, 10', and 20 having a high diffraction angle are applied to the optical scanner, an operational range (i.e., a scanning range) of the optical scanner may be increased so that a structure of an optical system used in the optical scanner becomes simple. In particular, a separate optical system that would otherwise be required to increase the operational range is not needed.

Figure 7:
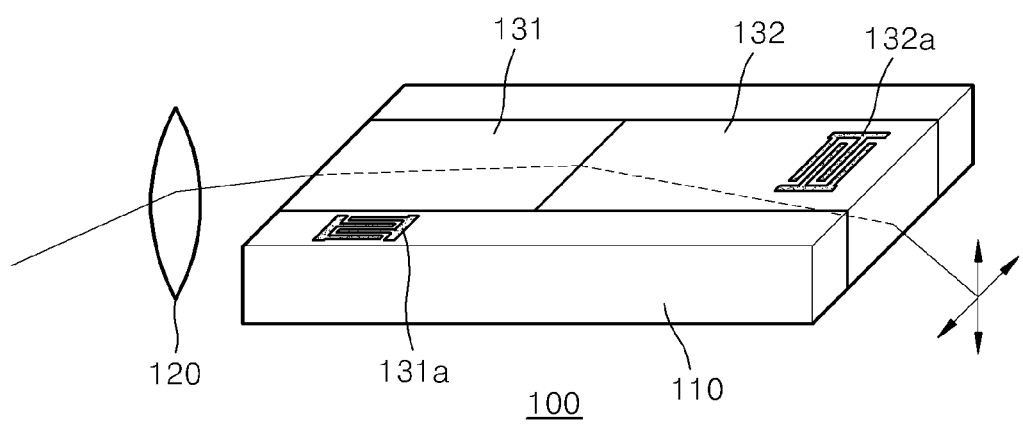
FIG. 7 is a perspective view of an optical scanner including an acousto-optic device according to an example.

FIG. 7 is a perspective view of an optical scanner 100 including any of the acousto-optic devices 10, 10', and 20 according to an example. Referring to FIG. 7, the optical scanner 100 includes a substrate 110, a first acousto-optic device 131 disposed in the substrate 110, a second acousto-optic device 132 disposed in the substrate 110 and adjacent to the first acousto-optic device 131, an optical coupling device 120 making light incident on the first acousto-optic device 131, a first sonic wave generator 131a that applies SAWs to the first acousto-optic device 131, and a second sonic wave generator 132a that applies SAWs to the second acousto-optic device 132.

Although not specifically shown in FIG. 7, the first acousto-optic device 131 and the second acousto-optic device 132 may include tapered optical waveguides and metal layers surrounding the tapered optical waveguides as shown in the acousto-optic devices 10, 10', and 20. Although the first sonic wave generator 131a is disposed on the substrate 110 and the second sonic wave generator 132a is disposed on the second acousto-optic device 132 in FIG. 7, this is merely an example. The positions of the first sonic wave generator 131a and the second sonic wave generator 132a may be freely selected in consideration of a propagation direction of SAWs to be applied. For example, the first sonic wave generator 131a may be disposed in a side surface of the substrate 110 or on an upper surface of the first acousto-optic device 131. Likewise, the second sonic wave generator 132a may be disposed an upper surface of the substrate 110 or the side surface of the substrate 110.

Although a refractive lens is shown as the optical coupling device 120 in FIG. 7, other optical devices, such as a prism, a diffraction grating layer, a Fresnel lens, a microlens array, a slit, etc., may be used as the optical coupling device 120.

The first acousto-optic device 131 may be configured to deflect light in a horizontal direction. The second acousto-optic device 132 may be configured to deflect light in a vertical direction. That is, as shown in FIG. 7, light incident onto the first acousto-optic device 131 through the optical coupling device 120 is deflected in a horizontal direction by the first acousto-optic device 131, deflected in a vertical direction by the second acousto-optic device 132, and then output. Therefore, when an intensity and a frequency of an alternating current (AC) applied to the first sonic wave generator 131a and the second sonic wave generator 132a are modulated, the incident light may be horizontally and/or vertically scanned within a predetermined angle range by the optical scanner 100.

Although the optical scanner 100 of FIG. 7 includes both the first acousto-optic device 131 and the second acousto-optic device 132, in another example, the optical scanner 100 may include only one acousto-optic device that scans light in only the horizontal direction or only the vertical direction, or may include a plurality of acousto-optic devices that each scan light in only the horizontal direction and/or a plurality of acousto-optic devices that each scan light in only the vertical direction. Providing such a plurality of acousto-optic devices that each scan light in only one direction makes it possible to increase the scanning range in that direction. The optical scanner 100 of FIG. 7 may be applied to a laser image projecting apparatus, a laser printer, or any other apparatus known in the art that scans light.

The acousto-optic devices 10, 10', and 20 may also be applied to a two-dimensional/three-dimensional (2D/3D) switching stereoscopic image display apparatus as described below.

Figure 8:
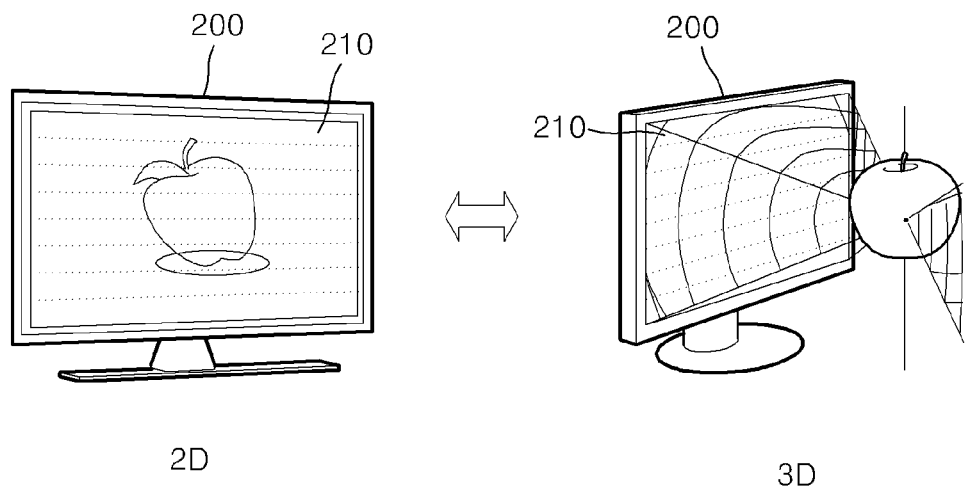
FIG. 8 illustrates an acousto-optic device applied to a two-dimensional/three-dimensional (2D/3D) switching stereoscopic image display apparatus according to an example.

FIG. 8 illustrates any of the acousto-optic devices 10, 10', and 20 applied to a 2D/3D switching stereoscopic image display apparatus according to an example. Referring to FIG. 8, a plurality of acousto-optic devices 210 that have the same height as a pixel or a plurality of pixel rows of a display panel 200 and a same width as a display surface of the display panel 200 are manufactured, and the acousto-optic devices 210 are arrayed on a surface of the display panel 200 to form an array in a vertical direction. The acousto-optic devices 210 may be any of the acousto-optic devices 10, 10', and 20. Thus, each acousto-optic device 210 may correspond to one pixel row or a plurality of pixel rows of the display panel 200, and may deflect an image displayed on one pixel row or a plurality of pixel rows of the display panel 200 in a predetermined direction. Alternatively, one acousto-optic device 210 may correspond to a plurality of pixels forming a part of one pixel row or a part of a plurality of pixel rows of the display panel 200.

If sonic waves are not applied to the acousto-optic mediums of the acousto-optic devices 210, an image displayed on each pixel row of the display panel 200 is not deflected and passes through the array of the acousto-optic devices 210. In this case, as illustrated on the left side of FIG. 8, the 2D/3D switching stereoscopic image display apparatus operates in a 2D display mode. Alternatively, in a multi-view and stereoscopic image 3D display mode, sonic waves are applied to the acousto-optic mediums of the acousto-optic devices 210, causing each of the acousto-optic devices 210 to deflect the image displayed on one pixel row or a plurality of pixel rows to generate a plurality of information beams having a plurality of directions. For example, some of the acousto-optic devices 210 may deflect images to a viewer's right eye, and other ones of the acousto-optic devices 210 may deflect images to a viewer's left eye. Thus, as illustrated on the right side of FIG. 8, a viewer may watch a 3D image.

The acousto-optic devices 10, 10', and 20 may also be applied to a holographic 3D display apparatus as described below.

Figure 9:
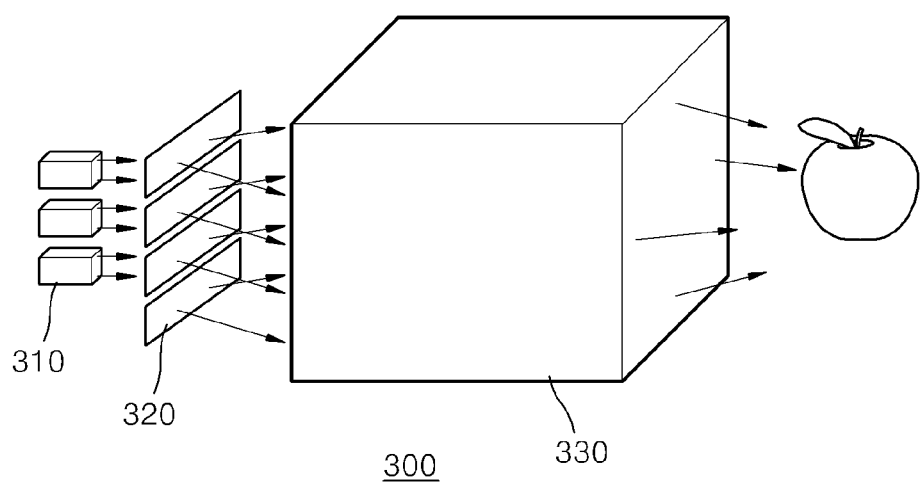
FIG. 9 illustrates an acousto-optic device applied to a holographic 3D display apparatus according to an example.

FIG. 9 illustrates any of the acousto-optic devices 10, 10', and 20 applied to a holographic 3D display apparatus 300 according to an example. For example, as illustrated in FIG. 9, the holographic 3D display apparatus 300 includes a light source 310, an array of a plurality of acousto-optic devices 320, and a projection optical system 330. The light source 310 may be an array of a plurality of lasers. Each of the acousto-optic devices 320 is manufactured to extend in a horizontal direction, and the acousto-optic devices 320 are arrayed in a vertical direction. Each acousto-optic device 320 may correspond to one hologram row in a horizontal direction of a hologram image to be displayed by the holographic 3D display apparatus 300. Alternatively, one acousto-optic device 320 may correspond to a part of one hologram row in the horizontal direction of the hologram image to be displayed by the holographic 3D display apparatus 300. Hologram rows that are diffracted by the acousto-optic devices 320 may be projected in a predetermined space by the projection optical system 330 and may form a stereoscopic image.

While this disclosure has been particularly shown and described with reference to examples thereof, it will be understood by those skilled in the art that various changes in form and details may be made in these examples without departing from the spirit and scope of the invention as defined by the claims and their equivalents. It should be understood that the examples described herein should be considered in a descriptive sense only, and not for purposes of limitation. Descriptions of features or aspects in each example are to be considered as being applicable to similar features or aspects in other examples. Suitable results may be achieved if the described techniques are performed in a different order and/or if components in a described system, architecture, device, or circuit are combined in a different manner and/or replaced or supplemented by other components or their equivalents. Therefore, the scope of the invention is defined not by the detailed description of the disclosure, but by the claims and their equivalents, and all variations within the scope of the claims and their equivalents are to be construed as being included in the invention.

What is claimed is:

1. An acousto-optic device comprising:
   an optical waveguide in which incident light propagates;
   a metal layer substantially surrounding a first portion of the optical waveguide;
   a gain medium layer in the first portion of the optical waveguide; and
   a sonic wave generator configured to generate surface acoustic waves (SAWs) and apply the SAWs to the optical waveguide and/or the metal layer.

2. The acousto-optic device of claim 1, further comprising a substrate;
   wherein the optical waveguide is disposed on a surface of the substrate.

3. The acousto-optic device of claim 2, wherein the optical waveguide is disposed on a first surface of the substrate; and
   the sonic wave generator is disposed on a second surface of the substrate that is substantially perpendicular to the first surface of the substrate, or on the first surface of the substrate.

4. The acousto-optic device of claim 2, further comprising at least one additional optical waveguide in which light is able to propagate and having a same structure as the optical waveguide, such that the acousto-optic device comprises optical waveguides;
   wherein the optical waveguides are disposed on the surface of the substrate parallel to each other at a uniform spacing.

5. The acousto-optic device of claim 1, wherein the optical waveguide has a tapered cross-section comprising at least one oblique surface.

6. The acousto-optic device of claim 5, wherein the tapered cross-section of the optical waveguide has a trapezoid shape comprising:
   a first surface;
   a second surface that is wider than the first surface and is parallel to the first surface;
   a third surface that is wider than the first surface and connects a first end of the first surface to a first end of the second surface; and
   a fourth surface that is wider than the first surface and connects a second end of the first surface to a second end of the second surface;
   wherein the third surface and/or the fourth surface is oblique to the first surface and the second surface;
   the metal layer surrounds at least a narrow portion of the optical waveguide that is adjacent to the first surface; and
   the gain medium layer is disposed in the narrow portion of the optical waveguide.

7. The acousto-optic device of claim 6, wherein a line parallel to the first surface and the second surface and halfway between the first surface and the second surface defines a midpoint of the optical waveguide; and
   the gain medium layer is disposed in a portion of the optical waveguide between the midpoint of the optical waveguide and the first surface.

8. The acousto-optic device of claim 6, wherein the metal layer surrounds at least the narrow portion of the optical waveguide and the gain medium layer.

9. The acousto-optic device of claim 1, wherein the gain medium layer comprises a light emitting material or a gain material capable of emitting or amplifying light in response to an optical or electrical stimulus.

10. The acousto-optic device of claim 9, wherein the gain medium layer comprises a multiple quantum well (MQW) structure in which quantum barrier layers and quantum well layers are alternately and repeatedly deposited, or a quantum dot.

11. The acousto-optic device of claim 1, further comprising at least one additional optical waveguide in which light is able to propagate and having a same structure as the optical waveguide, such that the acousto-optic device comprises optical waveguides;
    wherein there is a space between the metal layers of adjacent ones of the optical waveguides.

12. An optical scanner comprising:
    a first acousto-optic device of claim 1 configured to deflect light in a first direction;
    a second acousto-optic device of claim 1 configured to deflect light in a second direction perpendicular to the first direction; and
    an optical coupling device configured to make light incident on the first acousto-optic device.

13. The optical scanner of claim 12, further comprising a substrate;
    wherein the first acousto-optic device and the second acousto-optic device are disposed in the substrate adjacent to each other.

14. A two-dimensional/three-dimensional (2D/3D) switching stereoscopic image display apparatus comprising:
    a display panel; and
    an acousto-optic device array disposed on a surface of the display panel and configured to deflect an image to be displayed on the display panel;
    wherein the acousto-optic device array comprises the acousto-optic device of claim 1.

15. The (2D/3D) switching stereoscopic image display apparatus of claim 14, wherein each of the acousto-optic devices of the acousto-optic device array extends in a horizontal direction; and
    the acousto-optic devices are arrayed in a vertical direction.

16. The (2D/3D) switching stereoscopic image display apparatus of claim 15, wherein each of the acousto-optic devices of the acousto-optic device array corresponds to one pixel row of the display panel.

17. A holographic display apparatus comprising:
    a light source configured to emit light;
    an acousto-optic device array configured to deflect the light emitted from the light source, and comprising the acousto-optic device of claim 1; and
    a projection optical system configured to project the light deflected by the acousto-optic device array.

18. The holographic display apparatus of claim 17, wherein each of the acousto-optic devices of the acousto-optic device array extends in a horizontal direction; and
    the acousto-optic devices are arrayed in a vertical direction.

19. The holographic display apparatus of claim 17, wherein the acousto-optic devices generate hologram rows in a horizontal direction of a hologram image displayed by the holographic display apparatus; and
    each of the acousto-optic devices of the acousto-optic device array corresponds to one of the hologram rows.

20. An acousto-optic device comprising:
    a substrate;
    two metal layers on the substrate and parallel to each other;
    an optical waveguide substantially between the two metal layers and in which incident light propagates;

a gain medium layer in the optical waveguide between adjacent ones of the two metal layers in a portion of the optical waveguide that is adjacent to the substrate; and a sonic wave generator configured to generate surface acoustic waves (SAWs) and apply the SAWs to the optical waveguide and/or the at least two metal layers.

21. The acousto-optic device of claim 20, wherein the at least two metal layers extend in a direction in which the incident light propagates in the optical waveguide.

22. The acousto-optic device of claim 20, wherein the at least two metal layers and the optical waveguide each have a tapered cross-section comprising at least one oblique surface.

23. The acousto-optic device of claim 22, wherein the tapered cross-section of each of the at least two metal layers has a trapezoid shape comprising:

a first surface adjacent to the substrate;

a second surface that is wider than the first surface and is parallel to the first surface;

a third surface that is wider than the first surface and connects a first end of the first surface to a first end of the second surface; and a fourth surface that is wider than the first surface and connects a second end of the first surface to a second end of the second surface;

wherein the third surface and/or the fourth surface is oblique to the first surface and the second surface; and the tapered cross-section of the optical waveguide has an inverse trapezoid shape comprising:

a fifth surface;

a sixth surface adjacent to the substrate that is wider than the fifth surface and is parallel to the fifth surface;

a seventh surface that is wider than the fifth surface and connects a first end of the fifth surface to a first end of the sixth surface; and an eight surface that is wider than the fifth surface and connects a second end of the fifth surface to a second end of the sixth surface;

wherein the seventh surface and/or the eighth surface is oblique to the fifth surface and the sixth surface.

24. The acousto-optic device of claim 23, wherein the gain medium layer is disposed in the optical waveguide at least between adjacent ones of the at least two metal layers in a narrow portion of the optical waveguide that is adjacent to the substrate.

25. An optical scanner comprising:

a first acousto-optic device of claim 20 configured to deflect light in a first direction;

a second acousto-optic device of claim 20 configured to deflect light in a second direction perpendicular to the first direction; and an optical coupling device configured to make light incident on the first acousto-optic device.

26. A two-dimensional/three-dimensional (2D/3D) switching stereoscopic image display apparatus comprising:

a display panel; and an acousto-optic device array disposed on a surface of the display panel and configured to deflect an image to be displayed on the display panel;

wherein the acousto-optic device array comprises the acousto-optic device of claim 20.

27. A holographic display apparatus comprising:

a light source configured to emit light;

an acousto-optic device array configured to deflect the light emitted from the light source, and comprising the acousto-optic device of claim 20; and a projection optical system configured to project the light deflected by the acousto-optic device array.

28. An acousto-optic device comprising:

an optical waveguide through which light propagates;

a gain medium layer in the optical waveguide;

a metal layer substantially surrounding a portion of the optical waveguide in which the gain medium layer is disposed; and a sonic wave generator configured to generate surface acoustic waves (SAWs) and apply the SAWs to the optical waveguide and/or the metal layer.

29. The acousto-optic device of claim 28, wherein the optical waveguide has a cross-section comprising at least one surface that is oblique to at least one other surface.

30. The acousto-optic device of claim 28, wherein the optical waveguide has a cross-section comprising a narrow end and a wide end that is wider than the narrow end;

the gain medium layer is disposed in the optical waveguide so that the gain medium layer is closer to the narrow end than to the wide end; and the metal layer surrounds at least a portion of the optical waveguide that extends from the narrow end to a position of the gain medium layer.

31. The acousto-optic device of claim 28, wherein the gain medium layer comprises a light emitting material or a gain material capable of emitting or amplifying light in response to surface plasmons excited at an interface between the optical waveguide and the metal layer by light propagating through the optical waveguide.

32. The acousto-optic device of claim 1, wherein the gain medium layer is disposed near a vertex of the optical waveguide.

33. The acousto-optic device of claim 1, wherein the optical waveguide has a tapering angle, a full width at half-maximum (FWHM) and a height for a maximum diffraction angle.

* * * * *